United States Patent
Bonne et al.

(10) Patent No.: US 12,232,227 B2
(45) Date of Patent: Feb. 18, 2025

(54) HIGH SPEED IMAGE REFRESH SYSTEM

(71) Applicant: Lumileds LLC, San Jose, CA (US)

(72) Inventors: Ronald Johannes Bonne, Plainfield, IL (US); Udo Karbowski, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 18/207,556

(22) Filed: Jun. 8, 2023

(65) Prior Publication Data

US 2023/0403771 A1    Dec. 14, 2023

Related U.S. Application Data

(63) Continuation of application No. 17/341,725, filed on Jun. 8, 2021, now Pat. No. 11,723,123, which is a continuation of application No. 16/456,862, filed on Jun. 28, 2019, now Pat. No. 11,083,055.

(60) Provisional application No. 62/729,257, filed on Sep. 10, 2018.

(30) Foreign Application Priority Data

Oct. 30, 2018    (EP) .................................. 18203445

(51) Int. Cl.
    *H05B 45/10*    (2020.01)
    *B60Q 1/14*    (2006.01)

(52) U.S. Cl.
    CPC ............. *H05B 45/10* (2020.01); *B60Q 1/143* (2013.01); *B60Q 2300/054* (2013.01); *B60Q 2300/42* (2013.01); *B60Q 2300/45* (2013.01)

(58) Field of Classification Search
None
See application file for complete search history.

(56) References Cited

U.S. PATENT DOCUMENTS

| | | |
|---|---|---|
| 5,184,114 A | 2/1993 | Brown |
| 6,611,610 B1 | 8/2003 | Stam et al. |
| 6,728,393 B2 | 4/2004 | Stam et al. |
| 6,933,956 B2 | 8/2005 | Sato et al. |
| 7,526,103 B2 | 4/2009 | Schofield et al. |
| 7,542,861 B1 | 6/2009 | You et al. |
| 9,318,069 B2 | 4/2016 | Nambi et al. |
| 9,849,827 B2 | 12/2017 | Uchida et al. |
| 9,930,748 B1 | 3/2018 | Scenini |

(Continued)

FOREIGN PATENT DOCUMENTS

| | | |
|---|---|---|
| CN | 2549543 Y | 5/2003 |
| CN | 1650341 A | 8/2005 |

(Continued)

OTHER PUBLICATIONS

US 10,893,585 B2, 01/2021, Bonne et al. (withdrawn)

(Continued)

*Primary Examiner* — Nicholas J Lee
(74) *Attorney, Agent, or Firm* — Schwegman, Lundberg & Woessner, P.A.

(57) ABSTRACT

A LED controller for an LED pixel array includes an image frame buffer to receive image data and a standby image buffer connected to the image frame buffer to hold a standby image. A command and control module connected is configured to substitute the standby image in the standby image buffer for the image in the image frame buffer when image data is unavailable.

20 Claims, 10 Drawing Sheets

(56) References Cited

U.S. PATENT DOCUMENTS

| | | |
|---|---|---|
| 10,148,938 B2 | 12/2018 | Nagasaki et al. |
| 10,219,348 B1 | 2/2019 | Chung |
| 10,585,417 B2 | 3/2020 | Takayama et al. |
| 10,651,357 B2 | 5/2020 | Andrews |
| 10,932,336 B2 | 2/2021 | Bonne et al. |
| 11,083,055 B2 | 8/2021 | Bonne et al. |
| 11,590,881 B2 | 2/2023 | Funk et al. |
| 11,723,123 B2 | 8/2023 | Bonne et al. |
| 2001/0026646 A1 | 10/2001 | Morita et al. |
| 2002/0142504 A1 | 10/2002 | Feldman et al. |
| 2002/0171617 A1 | 11/2002 | Fuller |
| 2002/0186192 A1 | 12/2002 | Maruoka et al. |
| 2003/0038983 A1 | 2/2003 | Tanabe et al. |
| 2003/0058262 A1 | 3/2003 | Sato et al. |
| 2003/0222893 A1 | 12/2003 | Koester et al. |
| 2004/0095184 A1 | 5/2004 | Oka et al. |
| 2004/0114379 A1 | 6/2004 | Miller et al. |
| 2004/0119667 A1 | 6/2004 | Yang |
| 2004/0129887 A1 | 7/2004 | Vydrin et al. |
| 2004/0252874 A1 | 12/2004 | Yamazaki |
| 2005/0029872 A1 | 2/2005 | Ehrman et al. |
| 2006/0007059 A1 | 1/2006 | Bell |
| 2006/0017688 A1 | 1/2006 | Hohmann et al. |
| 2006/0237636 A1 | 10/2006 | Lyons et al. |
| 2007/0242337 A1 | 10/2007 | Bradley |
| 2008/0129206 A1 | 6/2008 | Stam et al. |
| 2008/0258637 A1 | 10/2008 | Leung |
| 2009/0040152 A1 | 2/2009 | Scheibe |
| 2009/0040775 A1 | 2/2009 | Scheibe |
| 2009/0322429 A1 | 12/2009 | Ivanov et al. |
| 2010/0073358 A1 | 3/2010 | Ozaki |
| 2010/0097525 A1 | 4/2010 | Mino |
| 2010/0259182 A1 | 10/2010 | Man et al. |
| 2010/0301777 A1 | 12/2010 | Kraemer |
| 2011/0012891 A1 | 1/2011 | Cheng et al. |
| 2011/0062872 A1 | 3/2011 | Jin et al. |
| 2012/0286135 A1 | 11/2012 | Gong et al. |
| 2012/0287144 A1 | 11/2012 | Gandhi et al. |
| 2012/0306370 A1 | 12/2012 | Van De Ven et al. |
| 2013/0082604 A1 | 4/2013 | Williams et al. |
| 2013/0106872 A1* | 5/2013 | Peng .................. G06F 3/1415 345/545 |
| 2014/0267329 A1 | 9/2014 | Lee et al. |
| 2015/0138212 A1 | 5/2015 | Bae et al. |
| 2015/0151671 A1 | 6/2015 | Refior et al. |
| 2015/0186098 A1 | 7/2015 | Hall |
| 2015/0204512 A1 | 7/2015 | Chen et al. |
| 2016/0081028 A1* | 3/2016 | Chang .................. H04W 52/027 455/566 |
| 2016/0081148 A1 | 3/2016 | Liang et al. |
| 2016/0104418 A1 | 4/2016 | Keum et al. |
| 2016/0155406 A1 | 6/2016 | Lee |
| 2016/0243980 A1 | 8/2016 | El Idrissi et al. |
| 2016/0275919 A1 | 9/2016 | Lawrence et al. |
| 2016/0302270 A1 | 10/2016 | Wang |
| 2016/0335957 A1 | 11/2016 | Fu et al. |
| 2016/0345392 A1 | 11/2016 | Scenini et al. |
| 2017/0243532 A1 | 8/2017 | Huang et al. |
| 2018/0074199 A1 | 3/2018 | Lin et al. |
| 2018/0079352 A1 | 3/2018 | Dalal |
| 2019/0013307 A1 | 1/2019 | Wu et al. |
| 2019/0057643 A1 | 2/2019 | Bae et al. |
| 2019/0132917 A1 | 5/2019 | Veenstra et al. |
| 2019/0189879 A1 | 6/2019 | Tandon et al. |
| 2020/0079278 A1 | 3/2020 | Bonne et al. |
| 2020/0079280 A1 | 3/2020 | Bonne et al. |
| 2020/0082503 A1 | 3/2020 | Bonne et al. |
| 2020/0082749 A1 | 3/2020 | Bonne |
| 2020/0084848 A1 | 3/2020 | Bonne et al. |
| 2020/0084853 A1 | 3/2020 | Bonne et al. |
| 2020/0084854 A1 | 3/2020 | Bonne et al. |
| 2020/0084868 A1 | 3/2020 | Bonne |
| 2020/0128640 A1 | 4/2020 | Van Voorst Vader |
| 2020/0166644 A1 | 5/2020 | Lin et al. |
| 2020/0365108 A1 | 11/2020 | Morein |
| 2021/0051781 A1 | 2/2021 | Song |
| 2021/0059027 A1 | 2/2021 | Lopez et al. |
| 2021/0298138 A1 | 9/2021 | Bonne et al. |

FOREIGN PATENT DOCUMENTS

| | | |
|---|---|---|
| CN | 101291558 A | 10/2008 |
| CN | 103839519 A | 6/2014 |
| CN | 204077513 U | 1/2015 |
| CN | 107610641 A | 1/2018 |
| CN | 112997242 | 6/2021 |
| DE | 102015016375 A1 | 6/2017 |
| DE | 102016003296 A1 | 9/2017 |
| EP | 2292464 A1 | 3/2011 |
| EP | 2626851 A2 | 8/2013 |
| GB | 2176042 A | 12/1986 |
| JP | S61273590 A | 12/1986 |
| JP | 2000275144 A | 10/2000 |
| JP | 2002247614 A | 8/2002 |
| JP | 2010136428 A | 6/2010 |
| JP | 2011107259 A | 6/2011 |
| JP | 2012003156 A | 1/2012 |
| JP | 2017162805 A | 9/2017 |
| JP | 2017220111 A | 12/2017 |
| JP | 2018060206 A | 4/2018 |
| KR | 101846329 B1 | 4/2018 |
| TW | 201110811 A | 3/2011 |
| TW | 202023858 | 7/2020 |
| TW | I745711 | 11/2021 |
| WO | WO-2009140963 A1 | 11/2009 |
| WO | WO-2013066017 A1 | 5/2013 |
| WO | WO-2014062425 A1 | 4/2014 |
| WO | WO-2020053716 A1 | 3/2020 |
| WO | WO-2020053717 A1 | 3/2020 |
| WO | WO-2020053718 A2 | 3/2020 |
| WO | WO-2020053719 A1 | 3/2020 |
| WO | WO-2020053718 A3 | 5/2020 |
| WO | WO-2021127537 A1 | 6/2021 |

OTHER PUBLICATIONS

"U.S. Appl. No. 16/456,835, Non Final Office Action mailed Jun. 11, 2020", 9 pgs.

"U.S. Appl. No. 16/456,835, Notice of Allowance mailed Jan. 27, 2020", 9 pgs.

"U.S. Appl. No. 16/456,835, Notice of Allowance mailed Oct. 8, 2020", 9 pgs.

"U.S. Appl. No. 16/456,844, Non Final Office Action mailed Feb. 5, 2020", 8 pgs.

"U.S. Appl. No. 16/456,844, Notice of Allowance mailed Aug. 6, 2020", 5 pgs.

"U.S. Appl. No. 16/456,849, Non Final Office Action mailed Oct. 29, 2020", 11 pgs.

"U.S. Appl. No. 16/456,858, 312 Amendment filed Nov. 25, 2020", 5 pgs.

"U.S. Appl. No. 16/456,858, Non Final Office Action mailed Feb. 20, 2020", 11 pgs.

"U.S. Appl. No. 16/456,858, Notice of Allowance mailed Aug. 28, 2020", 6 pgs.

"U.S. Appl. No. 16/456,858, PTO Response to Rule 312 Communication mailed Dec. 10, 2020", pgs.

"U.S. Appl. No. 16/456,858, Response filed May 20, 2020 to Non Final Office Action mailed Feb. 20, 2020", 8 pgs.

"U.S. Appl. No. 16/456,862 Supplemental Amendment filed Mar. 10, 2021", 7 pgs.

"U.S. Appl. No. 16/456,862, 312 Amendment filed May 13, 2021", 6 pgs.

"U.S. Appl. No. 16/456,862, Final Office Action mailed Sep. 14, 2020", 15 pgs.

"U.S. Appl. No. 16/456,862, Non Final Office Action mailed Mar. 6, 2020", 15 pgs.

"U.S. Appl. No. 16/456,862, Notice of Allowance mailed Mar. 18, 2021", 9 pgs.

"U.S. Appl. No. 16/456,862, Notice of Allowance mailed Dec. 2, 2020", 6 pgs.

(56) References Cited

OTHER PUBLICATIONS

"U.S. Appl. No. 16/456,862, Response filed Jun. 8, 2020 to Non Final Office Action mailed Mar. 6, 2020", 8 pgs.
"U.S. Appl. No. 16/456,862, Response filed Nov. 13, 2020 to Final Office Action mailed Sep. 14, 2020", 10 pgs.
"U.S. Appl. No. 16/456,868, Final Office Action mailed Oct. 15, 2020", 12 pgs.
"U.S. Appl. No. 16/456,868, Non Final Office Action mailed Apr. 1, 2020", 9 pgs.
"U.S. Appl. No. 16/456,874, Non Final Office Action mailed Aug. 5, 2020", 7 pgs.
"U.S. Appl. No. 17/341,725, 312 Amendment filed Jun. 15, 2023", 8 pgs.
"U.S. Appl. No. 17/341,725, Notice of Allowance mailed Mar. 15, 2023", 9 pgs.
"U.S. Appl. No. 17/341,725, PTO Response to Rule 312 Communication mailed Jul. 6, 2023", 2 pgs.
"Chinese Application Serial No. 201980074043.5, Office Action mailed Apr. 13, 2022", (w/ English Translation), 7 pgs.
"Chinese Application Serial No. 201980074043.5, Office Action mailed Nov. 16, 2021", (w/ English Translation), 17 pgs.
"Chinese Application Serial No. 201980074043.5, Response filed Mar. 31, 2022 to Office Action mailed Nov. 16, 2021", 14 pgs.
"Chinese Application Serial No. 201980074043.5, Response filed Jun. 27, 2022 to Office Action mailed Apr. 13, 2022", (w/ English Translation of Claims), 11 pgs.
"European Application Serial No. 18201763.2, European Search Report mailed Feb. 8, 2019", 1 pg.
"European Application Serial No. 18202319.2, Extended European Search Report mailed Feb. 12, 2019", 10 pgs.
"European Application Serial No. 18203445.4, Extended European Search Report mailed Jul. 22, 2019", 13 pgs.
"European Application Serial No. 18203445.4, Partial European Search Report mailed Apr. 12, 2019", 14 pgs.
"European Application Serial No. 19779599.0, Communication Pursuant to Article 94(3) EPC mailed Feb. 15, 2023", 14 pgs.
"European Application Serial No. 19779599.0, Response filed Oct. 19, 2021 to Communication pursuant to Rules 161(1) and 162 EPC", 11 pgs.
"International Application Serial No. PCT/IB2019/057504, International Search Report mailed Nov. 18, 2019", 3 pgs.
"International Application Serial No. PCT/IB2019/057504, Written Opinion mailed Nov. 18, 2019", 5 pgs.
"International Application Serial No. PCT/IB2019/057506, International Search Report mailed Oct. 31, 2019", 4 pgs.
"International Application Serial No. PCT/IB2019/057506, Written Opinion mailed Oct. 31, 2019", 10 pgs.
"International Application Serial No. PCT/IB2019/057507, International Preliminary Report on Patentability mailed Mar. 25, 2021", 26 pgs.
"International Application Serial No. PCT/IB2019/057507, International Search Report mailed Apr. 24, 2020", 6 pgs.
"International Application Serial No. PCT/IB2019/057507, Written Opinion mailed Apr. 24, 2020", 24 pgs.
"International Application Serial No. PCT/IB2019/057508, International Search Report mailed Nov. 12, 2019", 4 pgs.
"International Application Serial No. PCT/IB2019/057508, Written Opinion mailed Nov. 12, 2019", 10 pgs.
"Japanese Application Serial No. 2021-085794, Notification of Reasons for Rejection mailed Aug. 2, 2022", (w/ English Translation), 7 pgs.
"Japanese Application Serial No. 2021-513232, Notification of Reasons for Refusal mailed Oct. 12, 2021", w/ English Translation, 3 pgs.
"Japanese Application Serial No. 2021-513232, Written Opinion and Amendment filed Jan. 6, 2022 in response to Notification of Reasons for Refusal mailed Oct. 12, 2021", (w/ English Translation), 8 pgs.
"Korean Application Serial No. 10-2021-7010569, Notice of Preliminary Rejection mailed Oct. 21, 2021", (w/ English Translation), 3 pgs.
"Korean Application Serial No. 10-2021-7010569, Response filed Dec. 8, 2021 to Notice of Preliminary Rejection mailed Oct. 21, 2021", (w/ English Translation of Claims), 12 pgs.
"Taiwanese Application Serial No. 108123755, Notice mailed Aug. 26, 2020", (w/ English Translation), 6 pgs.
"Taiwanese Application Serial No. 108123755, Office Action mailed May 13, 2020", 11 pgs.
"Taiwanese Application Serial No. 108123756, Office Action mailed May 25, 2020", 29 pgs.
"Taiwanese Application Serial No. 108123757, Office Action mailed Apr. 12, 2021", (w/ English Translation), 4 pgs.
"Taiwanese Application Serial No. 108123757, Office Action mailed Nov. 25, 2020", (w/ English Translation), 27 pgs.
"Taiwanese Application Serial No. 108123757, Response filed Feb. 5, 2021 to Office Action mailed Nov. 25, 2020", w/ English Claims, 12 pgs.
"Taiwanese Application Serial No. 108123757, Response filed May 4, 2021 to Office Action mailed Apr. 12, 2021", (w/ English Translation), 35 pgs.
"Taiwanese Application Serial No. 108123758, Office Action mailed Jun. 29, 2020", (w/ English Translation), 11 pgs.
"U.S. Appl. No. 16/456,862, Examiner Interview Summary mailed Oct. 16, 2020", 3 pgs.
"International Application Serial No. PCT IB2019 057507, International to Pay Additional Fees mailed Jan. 8, 2020", 15 pgs.
"U.S. Appl. No. 16/456,858, Corrected Notice of Allowability mailed Nov. 12, 2020", 2 pgs.
"U.S. Appl. No. 16/456,858, Corrected Notice of Allowability mailed Jan. 19, 2021", 2 pgs.
"U.S. Appl. No. 16/456,862, PTO Response to Rule 312 Communication mailed May 21, 2021", 2 pgs.
"U.S. Appl. No. 16/456,862, Corrected Notice of Allowability mailed Jun. 23, 2021", 2 pgs.
"Japanese Application Serial No. 2021-513232, Voluntary Amendment filed May 19, 2021", with manual English translation, 12 pages.
"European Application Serial No. 19779599.0, Response filed May 3, 2023 to Communication Pursuant to Article 94(3) EPC mailed Feb. 15, 2023", 78 pgs.
"European Application Serial No. 19779599.0, Summons to Attend Oral Proceedings mailed May 2, 2024", 12 pgs.
"European Application Serial No. 19779599.0, EPO Written Decision to Refuse mailed Sep. 11, 2024", 15 pgs.
Bonne, Ronald Johannes, "U.S. Appl. No. 62/941,123, filed Non. 27, 2019", 32 pages.
Song, Zhi Hua, "U.S. Appl. No. 62/938,479, filed Nov. 21, 2019", 34 pages.
Song, Zhi Hua, "U.S. Appl. No. 62/938,527, filed Nov. 21, 2019", 37 pages.
Song, Zhi Hua, "Adaptive Pulse Width Modulation With Phase Shift for Micro-Light-Emitting Diode", U.S. Appl. No. 62/951,199, filed Dec. 20, 2019, 47 pgs.
Toni, Lopez, "U.S. Appl. No. 62/890,853, filed Aug. 23, 2019", 40 pages.
Zhi, Hua, "U.S. Appl. No. 62/888,246, filed Aug. 16, 2019", 31 pages.

\* cited by examiner

HIGH SPEED IMAGE REFRESH SYSTEM

CROSS REFERENCE TO RELATED APPLICATIONS

This application is a continuation of U.S. application Ser. No. 17/341,725, filed Jun. 8, 2021, which is a continuation of U.S. application Ser. No. 16/456,862, filed Jun. 28, 2019, which claims benefit of priority to European Patent Application No. 18203445.4 filed Oct. 30, 2018, and U.S. Provisional Patent Application No. 62/729,257 filed Sep. 10, 2018, all of which are incorporated herein by reference in their entireties.

TECHNICAL FIELD

The present disclosure relates generally to a microcontroller with external data image inputs that is able to support an addressable LED pixel array at high speed image refresh speeds.

BACKGROUND

While pixel arrays of LEDs with supporting CMOS circuitry have been used, practical implementations suitable for commercial use can face severe manufacture, power, and data management problems. Individual light intensity of thousands of emitting pixels may need to be controlled at refresh rates of 30-60 Hz. High data refresh rates are needed for many applications, and systems that support a variety of calibration, testing, and control methodologies are needed.

SUMMARY

In one embodiment, a LED controller for an LED pixel array includes a serial interface to an external data bus, along with an address generator connected to the serial interface and the LED pixel array. An image frame buffer is connected to the interface to receive image data and further connected to the address generator to receive an image frame buffer address. A command and control module is connected to the serial interface and configured to modify image frame buffer output signals. A calibration data storage module is connected to the command and control module to store calibration data related to pixel voltage response in the LED pixel array.

In one embodiment, a standby image buffer is connected to the image frame buffer to hold a default image. In another embodiment a pulse width modulator is connected between the image frame buffer and the LED pixel array.

In some embodiments, the image frame buffer can refresh held images at 60 Hz or greater speed. Image refresh data can be provided externally over a serial interface.

In one embodiment, the command and control module is connected to an ADC that receives temperature data. The command and control module can be connected to an ADC that receives $V_f$ data. In some embodiments, the command and control module can be connected to an DAC that receives $V_{bias}$ data.

The command and control module can be connected to a second interface providing external control signals. In another embodiment, the command and control module includes a bypass line connected to the LED pixel array to allow individual pixel addressing.

In some embodiments, the images in the image buffer can be either partially or differentially refreshed.

In some embodiments, a LED controller for an LED pixel array includes an image frame buffer to receive image data and a standby image buffer connected to the image frame buffer to hold a standby image. A command and control module is configured to substitute the standby image in the standby image buffer for the image in the image frame buffer when image data is unavailable. Image data may be unavailable due to errors in the image, or a failure to timely receive the image. In some embodiments image data held in the image frame buffer is provided at least in part by either a vehicle or the LED controller. Similarly, the standby image can be provided at least in part by either a vehicle or the LED controller.

DETAILED DESCRIPTION

Figure 1:
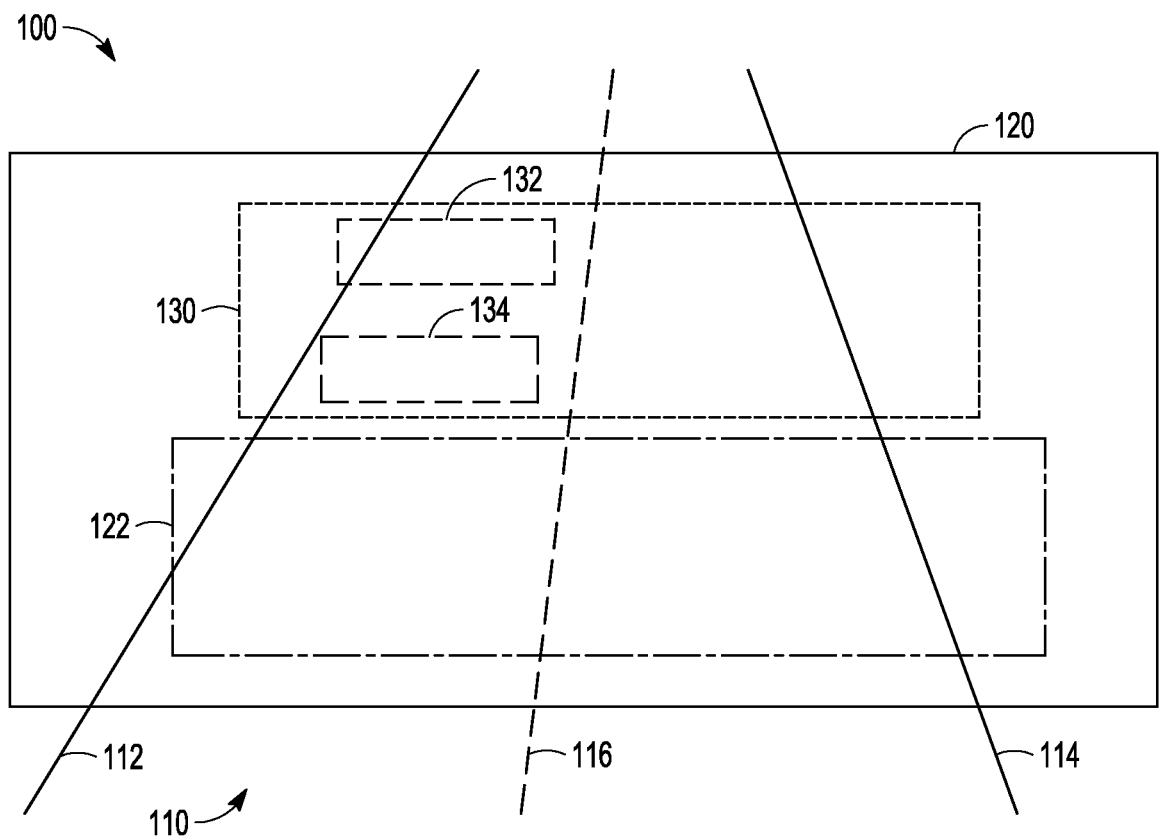
FIG. 1 is a diagram illustrating illumination of a road in discrete sectors using an active headlamp.

Light emitting pixel arrays may support applications that benefit from fine-grained intensity, spatial, and temporal control of light distribution. This may include, but is not limited to, precise spatial patterning of emitted light from pixel blocks or individual pixels. Depending on the application, emitted light may be spectrally distinct, adaptive over time, and/or environmentally responsive. The light emitting pixel arrays may provide preprogrammed light distribution in various intensity, spatial, or temporal patterns. The emitted light may be based at least in part on received sensor data and may be used for optical wireless communications. Associated optics may be distinct at a pixel, pixel block, or device level. An example light emitting pixel array may include a device having a commonly controlled central block of high intensity pixels with an associated common optic, whereas edge pixels may have individual optics. Common applications supported by light emitting pixel arrays include video lighting, automotive headlights, architectural and area illumination, street lighting, and informational displays.

Light emitting pixel arrays may be used to selectively and adaptively illuminate buildings or areas for improved visual display or to reduce lighting costs. In addition, light emitting pixel arrays may be used to project media façades for decorative motion or video effects. In conjunction with tracking sensors and/or cameras, selective illumination of areas around pedestrians may be possible. Spectrally distinct pixels may be used to adjust the color temperature of lighting, as well as support wavelength specific horticultural illumination.

Street lighting is an important application that may greatly benefit from use of light emitting pixel arrays. A single type of light emitting array may be used to mimic various street light types, allowing, for example, switching between a Type I linear street light and a Type IV semicircular street light by appropriate activation or deactivation of selected pixels. In addition, street lighting costs may be lowered by adjusting light beam intensity or distribution according to environmental conditions or time of use. For example, light intensity and area of distribution may be reduced when pedestrians are not present. If pixels of the light emitting pixel array are spectrally distinct, the color temperature of the light may be adjusted according to respective daylight, twilight, or night conditions.

Light emitting arrays are also well suited for supporting applications requiring direct or projected displays. For example, warning, emergency, or informational signs may all be displayed or projected using light emitting arrays. This allows, for example, color changing or flashing exit signs to be projected. If a light emitting array is composed of a large number of pixels, textual or numerical information may be presented. Directional arrows or similar indicators may also be provided.

Vehicle headlamps are a light emitting array application that requires large pixel numbers and a high data refresh rate. Automotive headlights that actively illuminate only selected sections of a roadway can used to reduce problems associated with glare or dazzling of oncoming drivers. Using infrared cameras as sensors, light emitting pixel arrays activate only those pixels needed to illuminate the roadway, while deactivating pixels that may dazzle pedestrians or drivers of oncoming vehicles. In addition, off-road pedestrians, animals, or signs may be selectively illuminated to improve driver environmental awareness. If pixels of the light emitting pixel array are spectrally distinct, the color temperature of the light may be adjusted according to respective daylight, twilight, or night conditions. Some pixels may be used for optical wireless vehicle to vehicle communication.

One high value application for light emitting arrays is illustrated with respect to FIG. 1, which shows potential roadway illumination pattern 100 for a vehicle headlamp system illuminating a region 120 in front of a vehicle. As illustrated, a roadway 110 includes a left edge 112, a right edge 114, and a centerline 116. In this example, two major regions are illuminated—a downward directed statically illuminated region 122 and a dynamically illuminated region 130. Light intensity within region 130 can be dynamically controlled. For example, as an oncoming vehicle (not shown) traveling between centerline 116 and left edge 112 moves into a subregion 132, light intensity can be reduced or shut off completely. As the oncoming vehicle moves toward subregion 134, a series of subregions (not shown) can be defined to also have reduced light intensity, reducing the chance of unsafe dazzle or glare. As will be appreciated, in other embodiments, light intensity can be increased to accentuate road signs or pedestrians, or spatial illumination patterns adjusted to allow, for example, dynamic light tracking of curved roadways.

Figure 2:
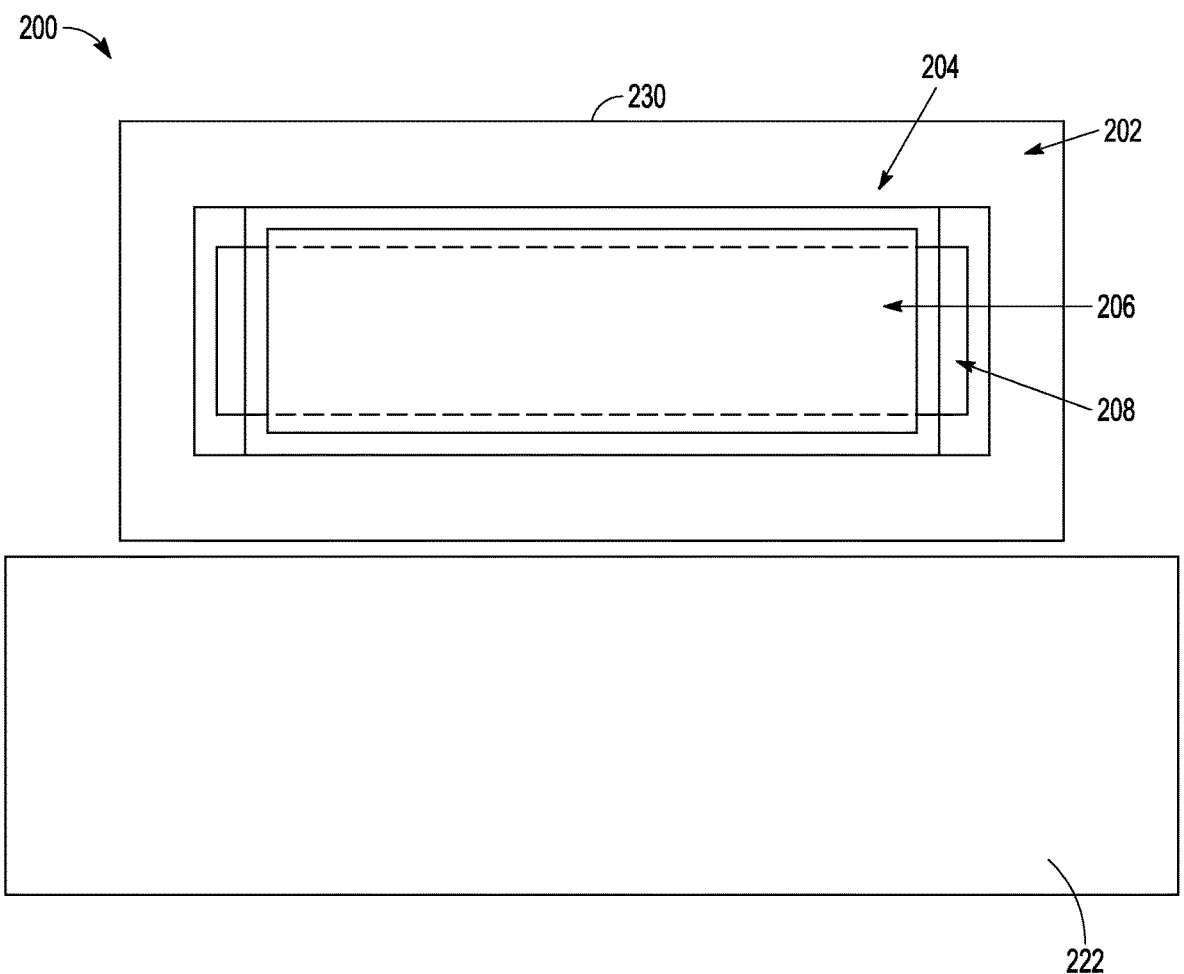
FIG. 2 illustrates a dynamic pixel addressable lighting module positioned adjacent to a static lighting module.

FIG. 2 illustrates a positioning of lighting modules 200 able to provide a lighting pattern such as discussed with respect to FIG. 1. An LED light module 222 can include LEDS, alone or in conjunction with primary or secondary optics, including lenses or reflectors. To reduce overall data management requirements, the light module 222 can be limited to on/off functionality or switching between relatively few light intensity levels. Pixel level control of light intensity is not necessarily supported.

Positioned adjacent to LED light module 222 is an active LED array 230. The LED array includes a CMOS die 202, with a pixel area 204 and alternatively selectable LED areas 206 and 208. The pixel area 204 can have 104 rows and 304 columns, for a total of 31,616 pixels distributed over an area of 12.2 by 4.16 millimeters. The selectable LED areas 206 and 208 allow for differing aspect ratios suitable for different vehicle headlamps or applications to be selected. For example, in one embodiment selectable LED area 206 can have a 1:3 aspect ratio with 82 rows and 246 columns, for a total of 20,172 pixels distributed over an area of 10.6 by 4 millimeters. Alternatively, selectable LED area 208 can have a 1:4 aspect ratio with 71 rows and 284 columns, for a total of 20,164 pixels distributed over an area of 12.1 by 3.2 millimeters. In one embodiment, pixels can be actively managed to have a 10-bit intensity range and a refresh rate of between 30 and 100 Hz, with a typical operational refresh rate of 60 Hz or greater.

Figure 3A:
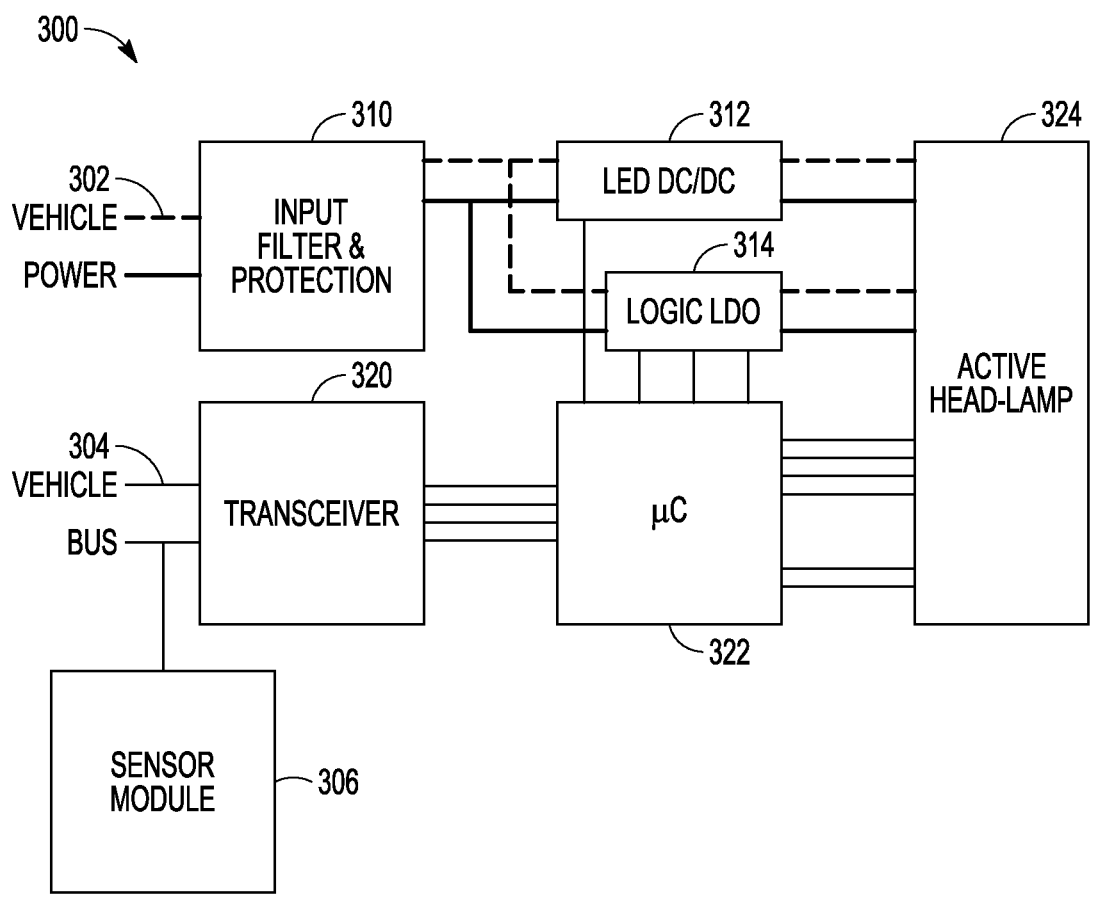
FIG. 3A is one embodiment of a vehicle headlamp system for controlling an active headlamp.

FIG. 3A illustrates an embodiment of a vehicle headlamp system 300 including a vehicle supported power (302) and control system including a data bus (304). A sensor module 306 can be connected to the data bus 304 to provide data related to environment conditions (e.g. time of day, rain, fog, ambient light levels, etc.), vehicle condition (parked, in-motion, speed, direction), or presence/position of other vehicles or pedestrians. A separate headlamp system 330 can be connected to the vehicle supported power and control system.

The vehicle headlamp system 300 can include an input filter and protection module 310. The module 310 can support various filters to reduce conducted emissions and provide power immunity. Electrostatic discharge (ESD) protection, load-dump protection, alternator field decay protection, and reverse polarity protection can also be provided by module 310.

Filtered power can be provided to a LED DC/DC module 312. Module 312 can be used only for powering LEDs, and typically has an input voltage of between 7 and 18 volts, with a nominal 13.2 volts. Output voltage can be set to be slightly higher (e.g. 0.3 volts) than LED array max voltage as determined by factory or local calibration, and operating condition adjustments due to load, temperature or other factors.

Filtered power is also provided to a logic LDO module 314 that can be used to power microcontroller 322 or CMOS logic in the active headlamp 324.

The vehicle headlamp system 300 can also include a bus transceiver 320 (e.g. with a UART or SPI interface) connected to microcontroller 322. The microcontroller 322 can translate vehicle input based on or including data from the sensor module 306. The translated vehicle input can include a video signal that is transferrable to an image buffer in the active headlamp 324. In addition, the microcontroller 322 can load default image frames and test for open/short pixels during startup. In one embodiment, a SPI Interface loads an image buffer in CMOS. Image frames can be full frame, differential or partial. Other microcontroller 322 features can include control interface monitors of CMOS status, including die temperature, as well as logic LDO output. In some embodiments, LED DC/DC output can be dynamically controlled to minimize headroom. In addition to providing image frame data, other headlamp functions such as complementary use in conjunction with side marker or turn signal lights, and/or activation of daytime running lights can also be controlled.

Figure 3B:
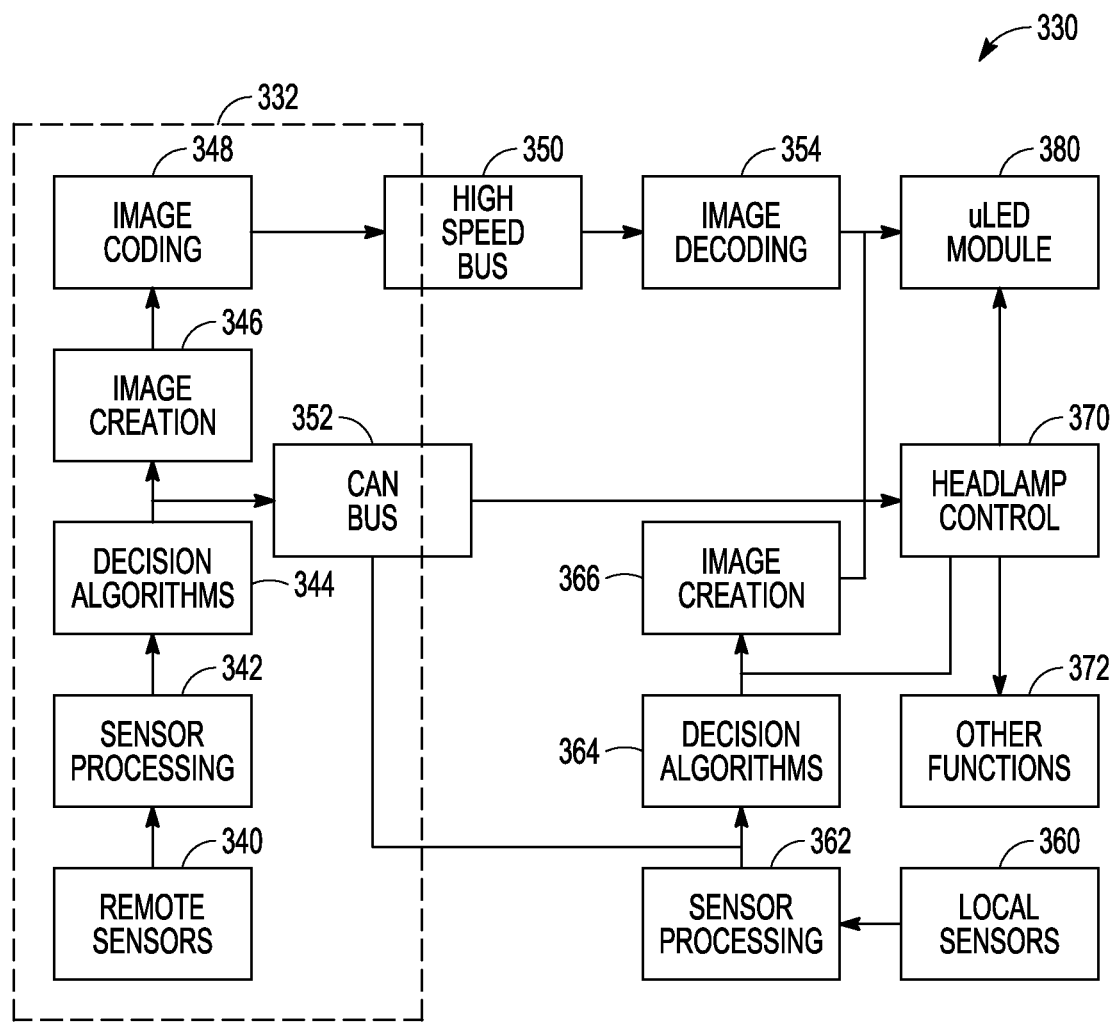
FIG. 3B is one embodiment of a vehicle headlamp system for controlling an active headlamp with connections to vehicle processing output.

FIG. 3B illustrates one embodiment of various components and modules of a vehicle headlamp system 330 capable of accepting vehicle sensor inputs and commands, as well as commands based on headlamp or locally mounted sensors. As seen in FIG. 3B, vehicle mounted systems 332 can include remote sensors 340 and electronic processing modules capable of sensor processing 342. Processed sensor data can be input to various decision algorithms in a decision algorithm module 344 that result in command instructions or pattern creation based at least in part on various sensor input conditions, for example, such as ambient light levels, time of day, vehicle location, location of other vehicles, road conditions, or weather conditions. As will be appreciated, useful information for the decision algorithm module 344 can be provided from other sources as well, including connections to user smartphones, vehicle to vehicle wireless connections, or connection to remote data or information resources.

Based on the results of the decision algorithm module 344, image creation module 346 provides an image pattern that will ultimately provide an active illumination pattern to the vehicle headlamp that is dynamically adjustable and suitable for conditions. This created image pattern can be encoded for serial or other transmission scheme by image coding module 348 and sent over a high speed bus 350 to an image decoding module 354. Once decoded, the image pattern is provided to the uLED module 380 to drive activation and intensity of illumination pixels.

In some operational modes, the system 330 can be driven with default or simplified image patterns using instructions provided to a headlamp control module 370 via connection of the decision algorithm module 344 through a CAN bus 352. For example, an initial pattern on vehicle start may be a uniform, low light intensity pattern. In some embodiments, the headlamp control module can be used to drive other functions, including sensor activation or control.

In other possible operational modes, the system 330 can be driven with image patterns derived from local sensors or commands not requiring input via the CAN bus 352 or high speed bus 350. For example, local sensors 360 and electronic processing modules capable of sensor processing 362 can be used. Processed sensor data can be input to various decision algorithms in a decision algorithm module 364 that result in command instructions or pattern creation based at least in part on various sensor input conditions, for example, such as ambient light levels, time of day, vehicle location, location of other vehicles, road conditions, or weather conditions. As will be appreciated, like vehicle supported remote sensors 340, useful information for the decision algorithm module 364 can be provided from other sources as well, including connections to user smartphones, vehicle to vehicle wireless connections, or connection to remote data or information resources.

Based on the results of the decision algorithm module 364, image creation module 366 provides an image pattern that will ultimately provide an active illumination pattern to the vehicle headlamp that is dynamically adjustable and suitable for conditions. In some embodiments, this created image pattern does not require additional image coding/decoding steps but can be directly sent to the uLED module 380 to drive illumination of selected pixels.

Figure 4:
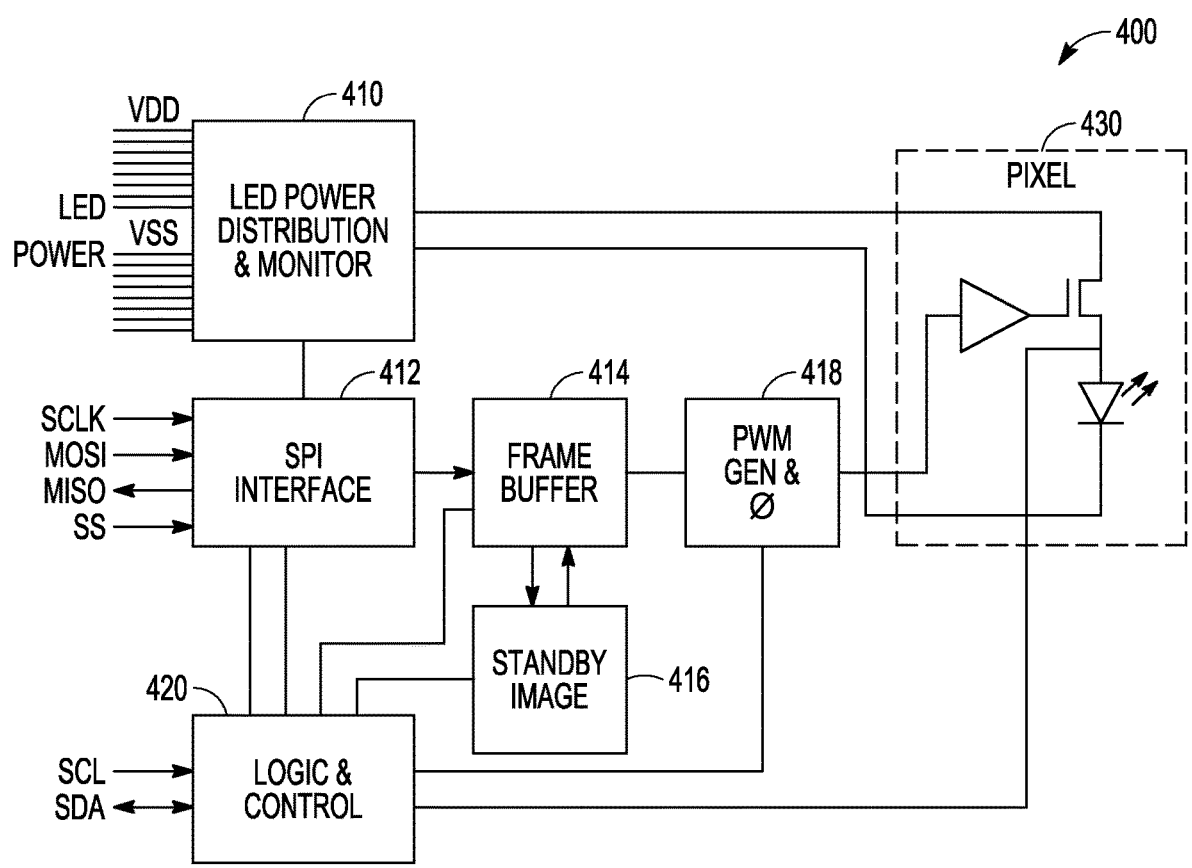
FIG. 4 is a schematic illustration of one embodiment of an active headlamp controller.

FIG. 4 illustrates one embodiment of various components and modules of an active headlamp system 400 such as described with respect to active headlamp 324 of FIG. 3A.

As illustrated, internal modules include an LED power distribution and monitor module 410 and a logic and control module 420.

Image or other data from the vehicle can arrive via an SPI interface 412. Successive images or video data can be stored in an image frame buffer 414. If no image data is available, one or more standby images held in a standby image buffer 416 can be directed to the image frame buffer 414. Such standby images can include, for example, an intensity and spatial pattern consistent with legally allowed low beam headlamp radiation patterns of a vehicle. Image data can also be replaced with standby images when the image data is determined to be in error, or when it is not timely received. In some embodiments, an image frame can be repeated from a determined number of times before substituting a standby image.

In operation, pixels in the images are used to define response of corresponding LED pixels in the pixel module 430, with intensity and spatial modulation of LED pixels being based on the image(s). To reduce data rate issues, groups of pixels (e.g. 5×5 blocks) can be controlled as single blocks in some embodiments. High speed and high data rate operation is supported, with pixel values from successive images able to be loaded as successive frames in an image sequence at a rate between 30 Hz and 100 Hz, with 60 Hz being typical. In conjunction with a pulse width modulation module 418, each pixel in the pixel module can be operated to emit light in a pattern and with an intensity at least partially dependent on the image held in the image frame buffer 414.

In one embodiment, intensity can be separately controlled and adjusted by setting appropriate ramp times and pulse width for each LED pixel using logic and control module 420 and the pulse width modulation module 418. This allows staging of LED pixel activation to reduce power fluctuations, and to provide various pixel diagnostic functionality.

Figure 5:
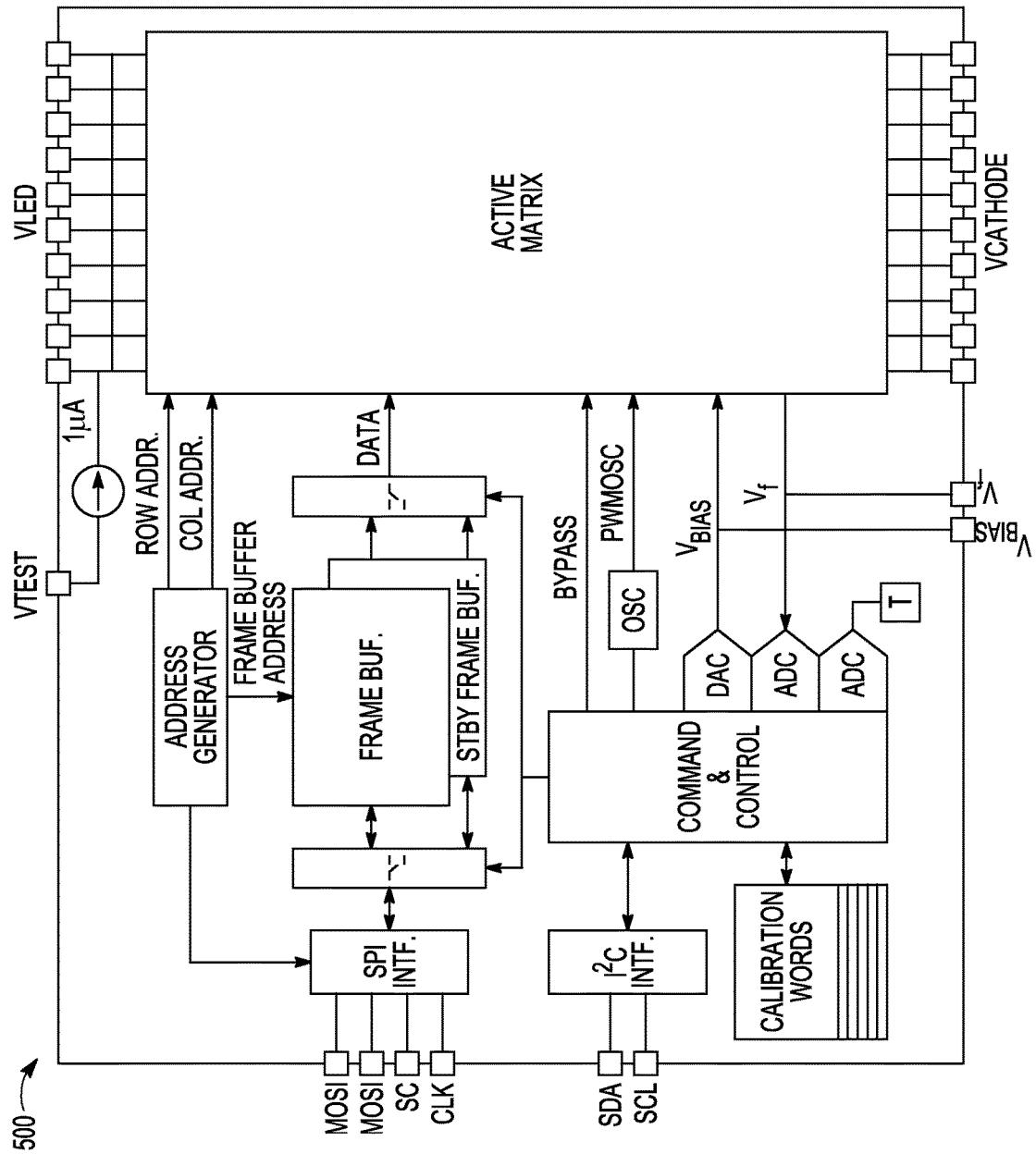
FIG. 5 is an illustration of a microcontroller assembly for an LED pixel array.

FIG. 5 illustrates a microcontroller assembly 500 for an LED pixel array. The assembly 500 can receive logic power via Vdd and Vss pins. An active matrix receives power for LED array control by multiple $V_{LED}$ and $V_{Cathode}$ pins. A Serial Peripheral Interface (SPI) can provide full duplex mode communication using a master-slave architecture with a single master. The master device originates the frame for reading and writing. Multiple slave devices are supported through selection with individual slave select (SS) lines. Input pins can include a Master Output Slave Input (MOSI), a Master Input Slave Output (MISO), a chip select (SC), and clock (CLK), all connected to the SPI interface.

In one embodiment, the SPI frame includes 2 stop bits (both "0"), 10 data bits, MSB first, 3 CRC bits (x3+x+1), a start 111b, and target 000b. Timing can be set per SafeSPI "in-frame" standards.

MOSI Field data can be as follows:
Frame 0: Header
Frame ½: Start Column Address [SCOL]
Frame ¾: Start Row Address [SROW}
Frame ⅚: Number of Columns [NCOL]
Frame ⅞: Number of Rows [NROW]
Frame 9: Intensity pixel [SCOL, SROW]
Frame 10: Intensity pixel [SCOL+1, SROW]
Frame 9+NCOL: Intensity pixel [SCOL+NCOL, SROW]
Frame 9+NCOL+1: Intensity pixel [SCOL, SROW+1]
Frame 9+NCOL+NROW: Intensity pixel [SCOL+NCOL, SROW+NROW]
MISO Field data can include loopback of frame memory.

A field refresh rate at 60 Hz (60 full frames per second) is supported, as is a bit rate of at least 10 Mbps, and typically between 15-20 Mbps.

The SPI interface connects to an address generator, frame buffer, and a standby frame buffer. Pixels can have parameters set and signals or power modified (e.g. by power gating before input to the frame buffer, or after output from the frame buffer via pulse width modulation or power gating) by a command and control module. The SPI interface can be connected to an address generation module that in turn provides row and address information to the active matrix. The address generator module in turn can provide the frame buffer address to the frame buffer.

The command and control module can be externally controlled via an Inter-Integrated Circuit (I²C) serial bus. A clock (SCL) pin and data (SDA) pin with 7-bit addressing is supported.

The command and control module include a digital to analog converter (DAC) and two analog to digital converters (ADC). These are respectively used to set $V_{bias}$ for a connected active matrix, help determine maximum $V_f$, and determine system temperature. Also connected are an oscillator (OSC) to set the pulse width modulation oscillation (PWMOSC) frequency for the active matrix. A bypass line is also present to allow address of individual pixels or pixel blocks in the active matrix for diagnostic, calibration, or testing purposes.

In one embodiment, the command and control module can provide the following inputs and outputs:

Input to CMOS chip:
VBIAS: Sets voltage bias for LDO's.
GET_WORD[ . . . ]: Requests Output from CMOS.
TEST_M1: Run Pixel Test: LDO in bypass mode, sequentially addresses columns, then rows, outputs VF, using internal 1 µA source.
$V_f$ values output via SPI.
TEST_M2: Run Pixel Test: LDO in bypass mode, sequentially addresses columns, then rows, outputs VF, using external I source.
$V_f$ values output via SPI.
TEST_M3: LDO in bypass mode, addressing through I2C, using internal 1 µA source, $V_f$ output via I2C.
TEST_M4: LDO in bypass mode, addressing through I2C, using external I source, $V_f$ output via I2C.
BUFFER_SWAP: Swap to/from standby buffer.
COLUMN_NUM: Addresses a specific row.
ROW_NUM: Addresses a specific column.
Output from CMOS chip:
CW_PHIV_MIN, CW_PHIV_AVG, CW_PHIV_MAX: factory measured EOL global luminous flux data.
CW_VLED_MIN, CW_VLED_AVG, CW_VLED_MAX: factory measured EOL global forward voltage data.
CW_SERIALNO: die/CMOS combo serial number for traceability purposes.
TEMP_DIE: Value of Die Temperature.
VF: Value of $V_f$ bus when being addressed with COLUMN_NUM and ROW_NUM.
BUFFER_STATUS: Indicates which buffer is selected.

Various calibration and testing methods for microcontroller assembly 500 are supported. During factory calibration a $V_f$ of all pixels can be measured. Maximum, minimum and average $V_f$ of the active area can be "burned" as calibration frame. Maximum $V_f$ and dVf/dT calibration frames can be used together with measured die temperature to determine actual $V_{LED}$ dynamically. Typically, a $V_{LED}$ of between 3.0V—4.5V is supported, with actual value being determined by feedback loop to external DC/DC converter such as described with respect to FIG. 3.

Figure 6A:
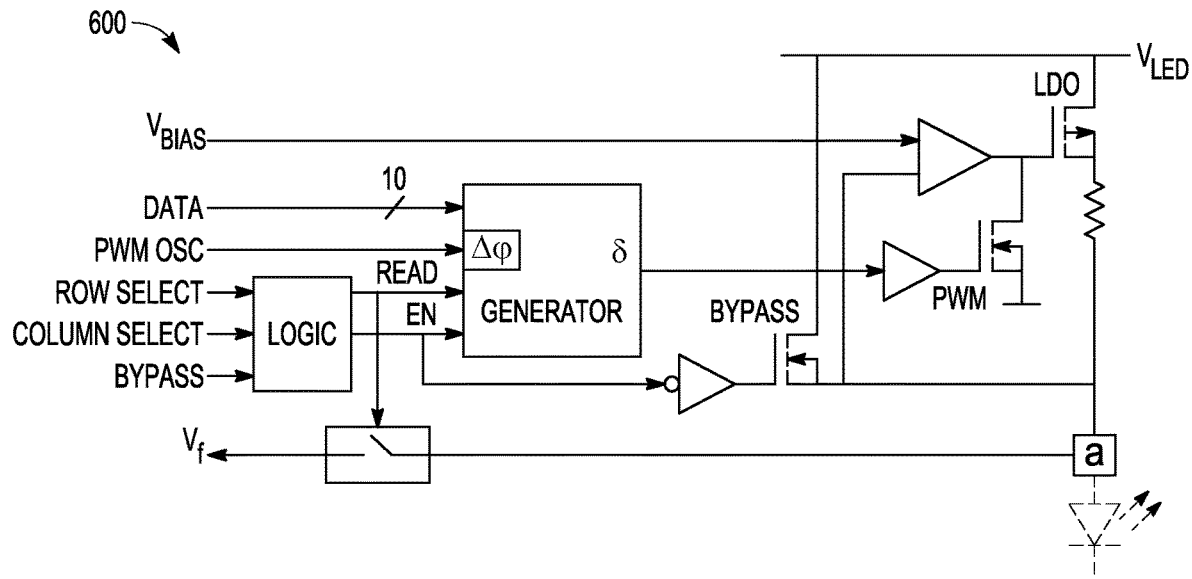
FIGS. 6A and 6B respectively illustrates an LDO bypass circuit for a pixel control circuit and gate timing diagram.
Figure 6B:
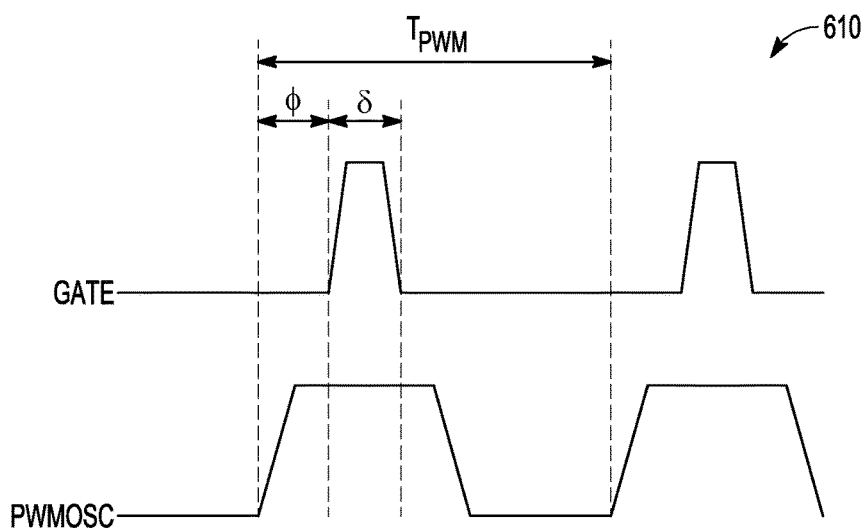

FIGS. 6A and 6B respectively illustrates one embodiment of a pixel control circuit 600 and associated timing diagram 610. Pixel control circuit 600 includes logic having row and column select, and a bypass signal. PWN OSC input and data, along with output from the logic are first fed into generator and then into a PWM. The PWM in turn has a duty cycle that controls activation of a particular pixel. This is described in more detail with respect to the following description of a pixel control circuit 630 of FIG. 6C. Factory calibration $V_f$ of all pixels can be measured at 1.0 µA and 1.0 mA using an external current source and LDO bypass functionality.

This operation can be bypassed when the LED pixel is supported by a low dropout (LDO) linear regulator as illustrated in the circuit 600. During bypass $V_f$ can be measured either with internal 1 µA current source or external current source on $V_{LED}$. Bypass can be done as a pixel by pixel operation using row and column select. Advantageously, this pixel bypass circuitry allows determination if a particular pixel is working correctly or if any fault situation has occurred.

As illustrated in FIG. 6B, image data and pulse width modulation oscillation clock data can be received by a pulse width modulator. Based on input from a logic module, gate timing including pulse start, ramp time and pulse duration/width (duty cycle) can be set on a per pixel basis. For example, the duty cycle (δ) can be loaded from frame buffer on "read". An 8-bit δ resolution can be supported. In one embodiment, the pulse leading-edge phase shift (φ) can be set differently for each pixel.

Figure 6C:
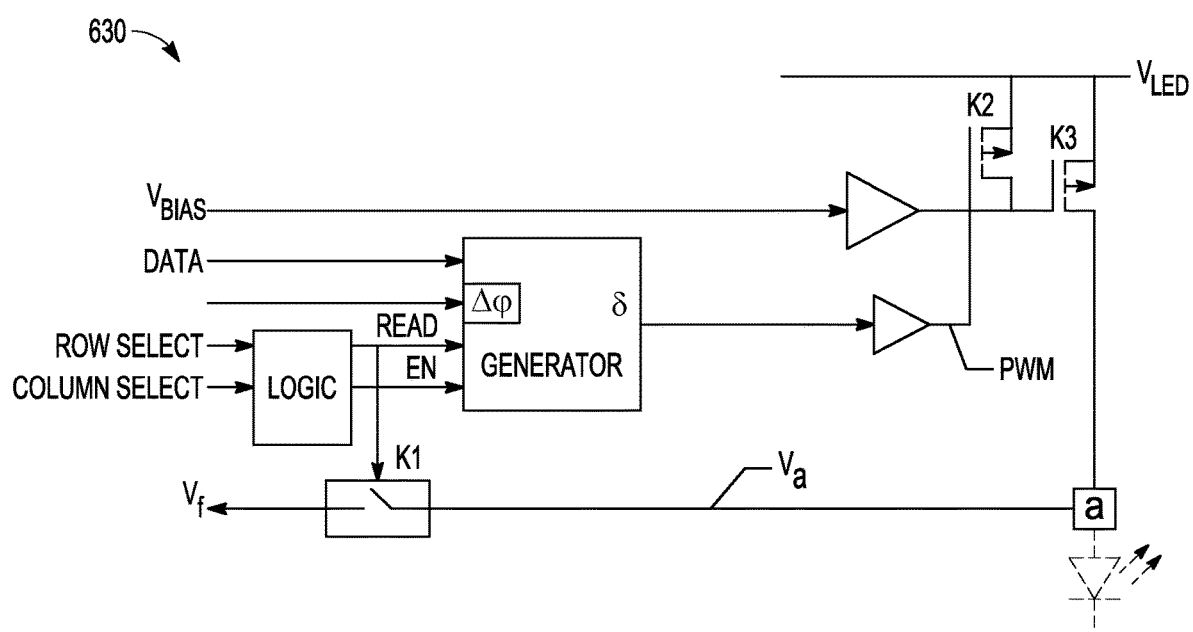
FIGS. 6C and 6D respectively illustrates an alternative pixel control circuit and gate timing diagram.

FIG. 6C illustrates a pixel control circuit 630 that does not support a bypass circuit. Pixel control circuit 630 includes logic having row and column select. Output from the logic are first fed into generator and then into a PWM. The PWM in turn has a duty cycle that controls activation of a particular pixel using additional circuitry in the following manner. Three switches, K1 through K3, are controlled by signals received from center control block outside pixels. Switch K3 is the current source, or LDO, and its current is controlled by $V_{bias}$. K2 is the PWM switch, which turns on and off based on the PWM duty cycle determined by the image data. In this example, K2 and K3 are P-channel MOSFet, but they can also be switches of any other suitable form. In FIG. 6C, the PWM signal is connected to the gate of K2, and the drain node of K2 is connected to the gate of K3. Consequently, when PWM signal is high, K2 is off and K3 is on, so the LED is on and the current is determined by Vbias voltage. When PWM is low, K2 is on, pulling K3 gate high and turning it off, so the LED is off.

Switch K1 is turned on and off based on row select and column select signal. K1 will be turned on only when the row and column of a specific pixel is selected, otherwise, it will stay off. When K1 is turned on, its impedance becomes low, and the LED forward voltage at the anode, or Va node of that pixel, will appear on the Vf bus. Since the impedance of Vf bus is much higher than that of K1 in the turn-on state, Vf voltage will equal to Va node voltage. When a fault situation happens in the circuit or the LED, the LED forward voltage may deviate from the normal value. Therefore, the Vf voltage can be used to determine if the pixel is working correctly or if any fault situation has occurred, without needing specific pixel bypass circuitry such as disclosed with respect to FIG. 6A. In this way, a real-time or "on-the-fly" detection can be realized such that the pixel status could be monitored and reported during operation.

Because the Vf bus is a shared node for all pixels, the K1 switch can be turned on for only one pixel at a time. The best time to detect fault situations would be when a pixel is turned on by the PWM. Preferably, the PWM values defined by the application image can be used for testing, but special test images may also be an option. When a pixel is turned off, the detection may still be done, although at a more limited level than during turn-on.

The K1 switching control with respect to the PWM can be flexible. Depending on detection requirements, the K1 frequency may be higher or lower than the PWM frequency. Apparently, the higher K1 frequency, the faster detection, i.e. the more pixels can be tested within a time range. E.g., if the PWM frequency is 500 Hz, only one pixel can be tested during one PWM period, or 2 ms, with a K1 frequency of 500 Hz, whereas ten pixels might be tested during 2 ms with a K1 frequency of 5000 Hz. Moreover, the two frequencies may be synchronous or asynchronous.

Figure 6D:
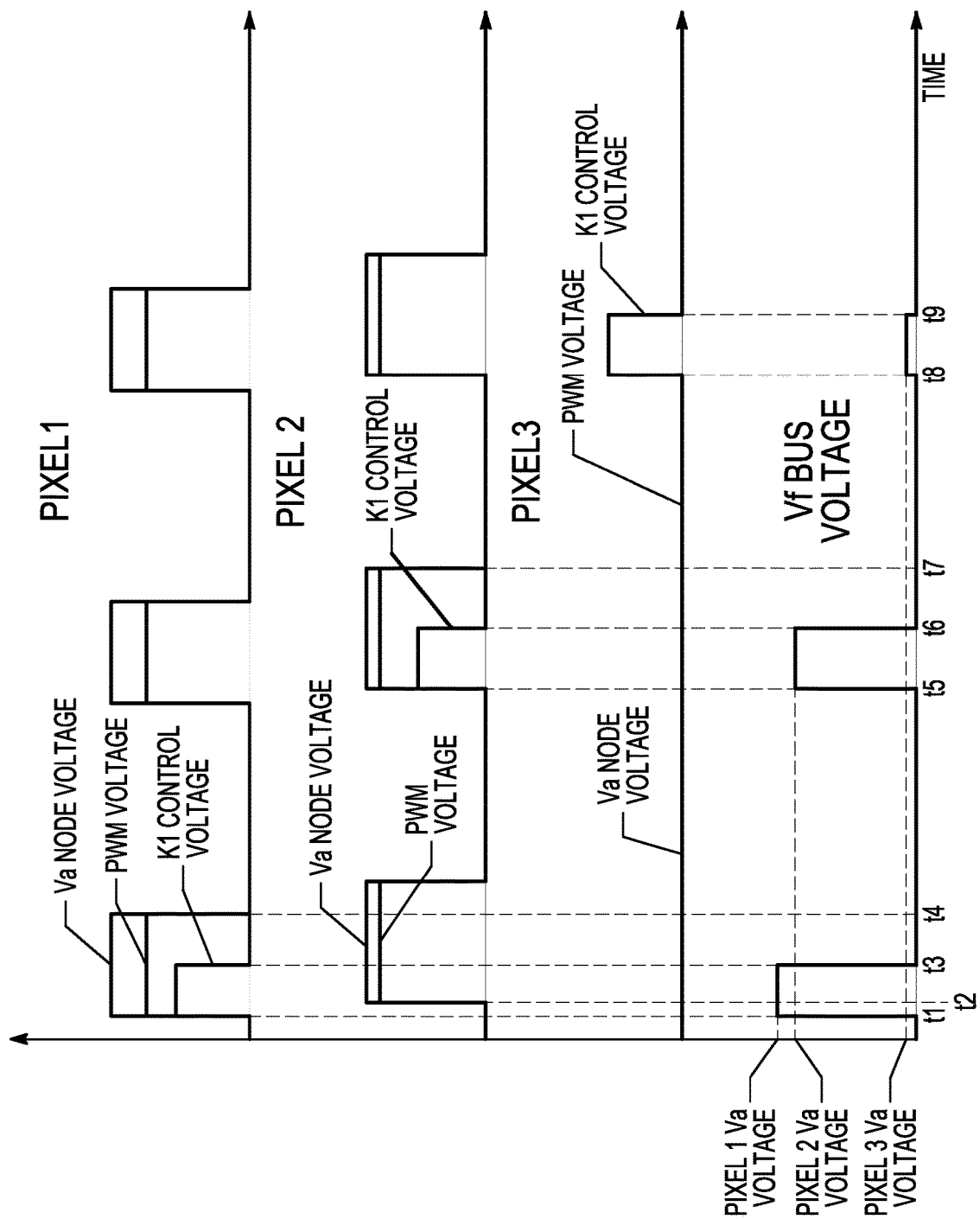

FIG. 6D illustrates an example control scheme for pixel control circuitry. In this embodiment, a K1 frequency is set close to PWM frequency with turn-on synchronized. Note that while this example only shows three pixels, it can be extended in a similar manner to a whole matrix array of pixels. For each pixel, the diagram shows the PWM signal voltage, Va node voltage and K1 control voltage. For a normal pixel, the Va node voltage is high when the PWM signal is high and low when the PWM is low. Likewise, the K1 is turned on when the K1 control voltage is high, and off when the control voltage is low. Depending on circuit design, control phase of PWM and K1 can be opposite, i.e. turning on the respective switch when low and turning it off when high.

Operation of pixel 1 proceeds as follows:

t1~t4: PWM voltage is high. The pixel is turned on and the Va node is high. In the meantime, the K1 control voltage is also high at t1, synchronized with the turn-on of PWM. K1 control voltage remains low for pixel 2 and 3. K1 of pixel 1 is turned on, and the Va node voltage appears on the Vf bus, so the Vf bus voltage equal to Va voltage of pixel 1 at this time. The turning-off moment of K1, t3, is earlier than that of the PWM, t4, so that the pixel test can complete before the pixel is turned off.

Operation of pixel 2 proceeds as follows:

At t2: PWM is high and the pixel is turned on. The slight lagging between t1 and t2 is the phase shift. At this moment, K1 of pixel 1 is still on, so K1 control voltage of pixel 2 is low and pixel 2 is not tested for this PWM cycle.

t5~t7: PWM is high and the pixel is turned on again at the second time. K1 control voltage is synchronized with pixel 2 at turn-on moment of t5 and stays on until t6. K1 control voltage remains low for other two pixels. Thus, the Vf bus voltage reflects the Va node voltage of pixel 2. In this example, the PWM duty cycle of pixel 2, which is the conduction or on time in percentage of the period or cycle time, is bigger than that of pixel 1. The Va voltage of pixel 2 is lower than that of pixel 1 when turned on.

Figure 7:
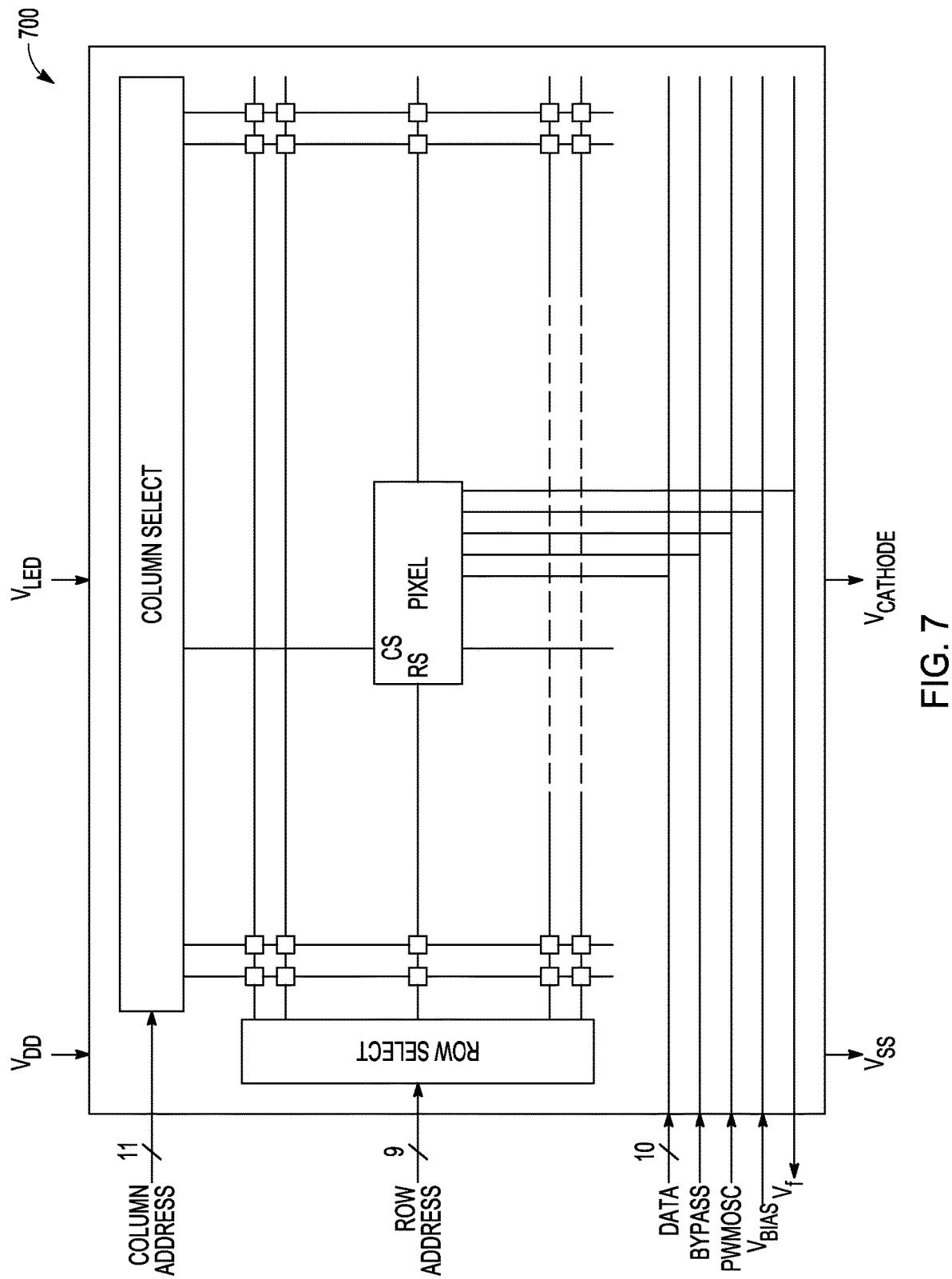
FIG. 7 illustrates an active matrix pixel array with row and column select supporting LDO bypass.

Operation of pixel 3 proceeds as follows:

PWM is low all the time. The pixel stays off and Va node voltage is low.

t8~t9: K1 control voltage is high for pixel 3 and low for other two pixels. Consequently, the Vf bus voltage represents the low Va voltage of pixel 3 at this time. The Va node voltage relation is:

FIG. 7 illustrate in more detail a block diagram 600 of active matrix array supporting LDO bypass. Row and column select are used to address individual pixels, which are supplied with a data line, a bypass line, a PWMOSC line, a $V_{bias}$ line, and a $V_f$ line. Timing and activation of a gate and pulse width modulator oscillator (PWMOSC) is illustrated with respect to FIG. 6B. As will appreciated, in certain embodiments LDO bypass is not required, and pixel testing can proceed using circuitry and/or control schemes described with respect to FIGS. 6C and 6D.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A method of fabricating an illumination device, the method comprising:
   coupling a light emitting diode (LED) array with a driver;
   coupling the driver with an image frame buffer configured to store data to control driving of the LED array by the driver;
   coupling the image frame buffer with a standby image frame buffer configured to store standby vehicle image data; and
   coupling a processor to the frame buffer, the processor configured to use instructions to:
      determine whether valid vehicle image data is present in the image frame buffer; and
      in response to determining that valid vehicle image data is not present in the image frame buffer, control the image frame buffer to load the standby vehicle image data and control the driver to drive the LED array using the standby vehicle image data to generate an image.

2. The method of claim 1, further comprising selecting the standby image data from among a plurality of sets of standby vehicle image data stored in the standby image buffer.

3. The method of claim 1, wherein determining whether valid image data is present in the image frame buffer comprises determining whether at least one error is present in the vehicle image data.

4. The method of claim 1, wherein the valid vehicle image data corresponds to an image having an intensity and spatial pattern consistent with a headlamp radiation pattern of the vehicle.

5. The method of claim 4, wherein the standby vehicle image data corresponds to an image having an intensity and spatial pattern consistent with a legally allowed low beam headlamp radiation pattern of the vehicle.

6. The method of claim 1, wherein the instructions further configure the processor to:
   determine whether sensor signals have been received from the vehicle, the sensor signals selected from a set of sensor signals that include environmental conditions, vehicle conditions, and presence and location of other vehicles and pedestrians proximate to the vehicle; and
   adjust the vehicle image data based on the sensor signals to generate the image.

7. The method of claim 1, wherein the instructions further configure the processor to determine whether valid vehicle image data is present in the image frame buffer by determining whether valid vehicle image data has been received at the image frame buffer via an interface to at least one peripheral component of a vehicle.

8. The method of claim 7, wherein the instructions further configure the processor to:
determine whether valid vehicle image data has been received at the image frame buffer by determining whether valid vehicle image data has been received for a set of multiple image frames to display a particular image for each of the set of multiple image frames, and
in response to determining that valid image data has been received at the image frame buffer for the multiple frames, repeat driving the LED array using the image data for another set of multiple image frames.

9. The method of claim 1, wherein the instructions further configure the processor to control the driver to set ramp times and pulse width to drive each LED pixel to generate the image.

10. The method of claim 1, wherein the instructions further configure the processor to:
control groups of pixels of the LED array as individual blocks; and
partially refresh the image data in the image frame buffer to alter the image by only the groups of pixels associated with the partially refreshed image data.

11. A compound metal oxide semiconductor (CMOS) backplane comprising:
a driver configured to drive a light emitting diode (LED) array attached thereto to generate an image from a vehicle based on image data supplied thereto;
an image frame buffer;
a standby image buffer coupled to the image frame buffer, the standby image buffer configured to hold sets of standby image data;
a controller coupled to the image frame buffer and the standby image buffer, the controller configured to select one set of the standby image data for transmission to the driver to generate an image by the LED array in response to a determination that the image frame buffer does not contain valid image data to supply to the driver; and
at least one filter configured to provide filtered power to components of the CMOS backplane.

12. The CMOS backplane of claim 11, wherein the at least one filter is configured to provide at least power protection selected from a set of power protections that include electrostatic discharge (ESD) protection, load-dump protection, alternator field decay protection, and reverse polarity protection.

13. The CMOS backplane of claim 11, wherein the valid image data and the standby image data each corresponds to an image having an intensity and spatial pattern consistent with a headlamp radiation pattern of a vehicle.

14. The CMOS backplane of claim 11, wherein the standby image data corresponds to an image having an intensity and spatial pattern consistent with a legally allowed low beam headlamp radiation pattern of the vehicle.

15. The CMOS backplane of claim 11, wherein the controller is further configured to:
determine whether sensor signals have been received from the vehicle, the sensor signals selected from a set of sensor signals that include environmental conditions, vehicle conditions, and presence and location of other vehicles and pedestrians proximate to the vehicle; and
adjust the valid image data based on the sensor signals to generate the image.

16. The CMOS backplane of claim 11, wherein the controller is further configured to:
determine whether valid image data has been received at the image frame buffer by determining whether valid vehicle image data has been received for a set of multiple image frames to display a particular image for each of the set of multiple image frames; and
in response to determining that valid image data has been received at the image frame buffer for the multiple frames, repeat driving the LED array using the image data for another set of multiple image frames.

17. The CMOS backplane of claim 11, wherein the controller is further configured to control the driver to set ramp times and pulse width to drive each LED pixel to generate the image.

18. The CMOS backplane of claim 11, wherein the controller is further configured to control groups of pixels of the LED array as individual blocks, the image data being partially refreshed to alter the image by only the groups of pixels associated with the partially refreshed image data.

19. A vehicle headlamp system, comprising:
a light emitting diode (LED) array;
a driver configured to drive the light emitting diode (LED) array to generate an image from a vehicle based on image data supplied thereto;
an image frame buffer;
a standby image buffer coupled to the image frame buffer, the standby image buffer configured to hold sets of standby image data;
a command and control module coupled to the image frame buffer and the standby image buffer, the controller configured to select one set of the standby image data for transmission to the driver to generate an image by the LED array in response to a determination that the image frame buffer does not contain valid image data to supply to the driver; and
at least one filter configured to provide filtered power to components of the vehicle headlamp system.

20. The vehicle headlamp system of claim 19, wherein the at least one filter is configured to provide at least power protection selected from a set of power protections that include electrostatic discharge (ESD) protection, load-dump protection, alternator field decay protection, and reverse polarity protection.

* * * * *